United States Patent
Masuda

(10) Patent No.: US 9,335,559 B2
(45) Date of Patent: May 10, 2016

(54) LIGHT SOURCE UNIT ABLE TO DIFFUSE LASER BEAM SUFFICIENTLY, PROJECTOR, AND IMAGE PROJECTION METHOD

(71) Applicant: CASIO COMPUTER CO., LTD., Shibuya-ku, Tokyo (JP)

(72) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 224 days.

(21) Appl. No.: 14/134,858

(22) Filed: Dec. 19, 2013

(65) Prior Publication Data
US 2014/0176916 A1 Jun. 26, 2014

(30) Foreign Application Priority Data
Dec. 21, 2012 (JP) .................. 2012-279883

(51) Int. Cl.
*G03B 21/20* (2006.01)
*G02B 27/48* (2006.01)
*H04N 9/31* (2006.01)

(52) U.S. Cl.
CPC .............. *G02B 27/48* (2013.01); *G03B 21/204* (2013.01); *G03B 21/208* (2013.01); *H04N 9/31* (2013.01); *H04N 9/3111* (2013.01); *H04N 9/3152* (2013.01)

(58) Field of Classification Search
CPC .......... G02B 27/48; G02B 19/00; G02B 5/02; G02B 21/20; G02B 21/00; G03B 21/14; H04N 5/74; F21V 13/02; F21V 17/02; F21V 9/16
See application file for complete search history.

(56) References Cited

U.S. PATENT DOCUMENTS

2008/0158512 A1* 7/2008 Mizushima .......... G02B 5/3083
353/20

FOREIGN PATENT DOCUMENTS

JP 2008-122823 A 5/2008

* cited by examiner

*Primary Examiner* — Sultan Chowdhury
*Assistant Examiner* — Danell L Owens
(74) *Attorney, Agent, or Firm* — Holtz, Holtz & Volek PC

(57) ABSTRACT

There is provided a light source unit having a light source which emits a laser beam, a plurality of diffusing plates on which the laser beam is incident and which emit the laser beam incident thereon as diffuse light, and a driving mechanism which moves the plurality of diffusing plates, wherein the laser beam from the light source is incident on one diffusing plate of the plurality of diffusing plates, and diffuse light emitted from the one diffusing plate is incident on the other diffusing plate of the plurality of diffusing plates.

11 Claims, 9 Drawing Sheets

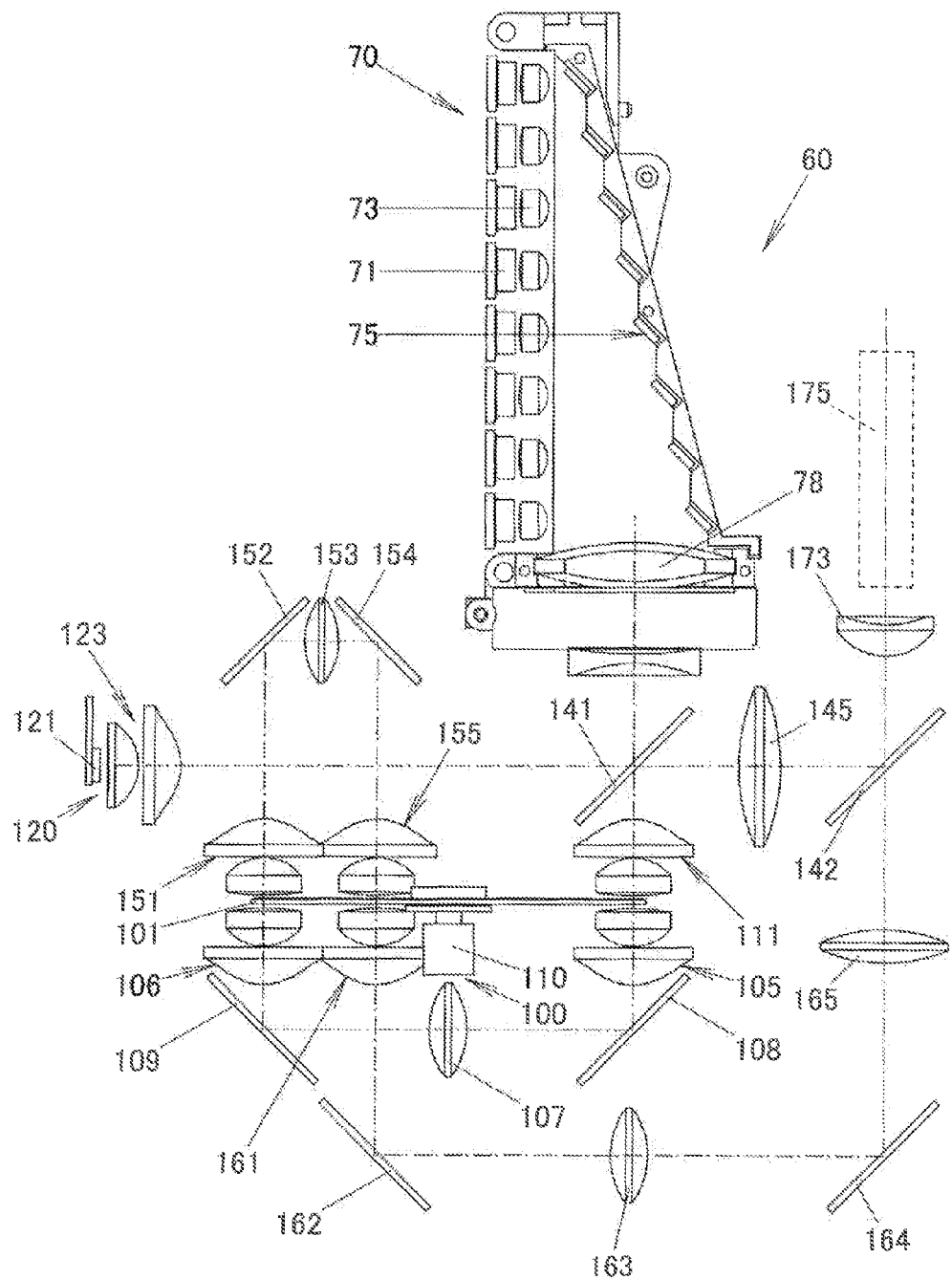

LIGHT SOURCE UNIT ABLE TO DIFFUSE LASER BEAM SUFFICIENTLY, PROJECTOR, AND IMAGE PROJECTION METHOD

CROSS-REFERENCE TO RELATED APPLICATION

This application is based upon and claims the benefit of priority under 35 USC 119 from the prior Japanese Patent Application No. 2012-279883 filed on Dec. 21, 2012, the entire contents of which are incorporated herein by reference.

BACKGROUND OF THE INVENTION

1. Field of the Invention

The present invention relates to a light source unit which is able to diffuse a laser beam sufficiently, a projector which includes this light source unit, and an image projection method.

2. Description of the Related Art

In these days, data projectors are used on many occasions as an image projection unit which projects images including an image of a screen and a video image of a personal computer, as well as images based on image data which is stored on a memory card on to a screen. In these data projectors, light emitted from a light source is caused to converge to a micromirror display element called a DMD (Digital Micromirror Device) or a liquid crystal panel so that a color image is displayed on a screen.

Conventionally, the mainstream of these projectors has been those which utilize a high-intensity discharge lamp as a light source. In recent years, however, there have been made many developments on projectors which use, as a light source, a light emitting diode, a laser diode, an organic electroluminescence, a luminescent material or the like.

Japanese Unexamined Patent Application (KOKAI) No. 2008-122823 (JP-2008-122823 A) discloses, as a projector which can project a highly bright image, a projector which uses a laser beam emitting device as a light source so that projection image light which is modulated by an image signal is formed by a laser beam which is emitted from the laser beam emitting device. Additionally, in this projector, in emitting projection image light formed by the laser beam, the projection image light is caused to pass through a movable diffusing portion so as to remove speckle noise generated in a projection image formed by the coherent laser beam.

In the projector as described above, the projection image light which is formed by modulating a coherent laser beam by the image signal is caused to pass through the movable diffusing portion in order to reduce or remove the speckle noise, thus the speckle noise in the projection image formed by the laser beam is reduced or removed, however there may be a case where the speckle noise remains in the projection image.

SUMMARY OF THE INVENTION

The invention has been made in view of the problem inherent in the related art which is described above, and an object of the invention is to provide a light source unit which can remove speckle noise in a projection image formed by a projector which makes use of a light source which uses a laser beam emitting device in a more ensured fashion, a projector which uses the light source unit, and an image projection method used by the projector.

With a view to achieving the object, according to an aspect of the invention, there is provided a light source unit having a light source which emits a laser beam, a plurality of diffusing plates on which the laser beam is incident and which emit the laser beam incident thereon as diffuse light, and a driving mechanism which moves the plurality of diffusing plates, wherein the laser beam from the light source is incident on one diffusing plate of the plurality of diffusing plates, and diffuse light emitted from the one diffusing plate is incident on the other diffusing plate of the plurality of diffusing plates.

BRIEF DESCRIPTION OF THE SEVERAL VIEWS OF THE DRAWINGS

The above object and further objects, features and advantages of the invention will be obvious by referring to the following detailed description together with accompanying drawings, in which FIG. 9 is a schematic diagram showing an example of a construction of a light source unit according to the further embodiment of the invention.

DETAILED DESCRIPTION OF THE PREFERRED EMBODIMENT

Figure 1:
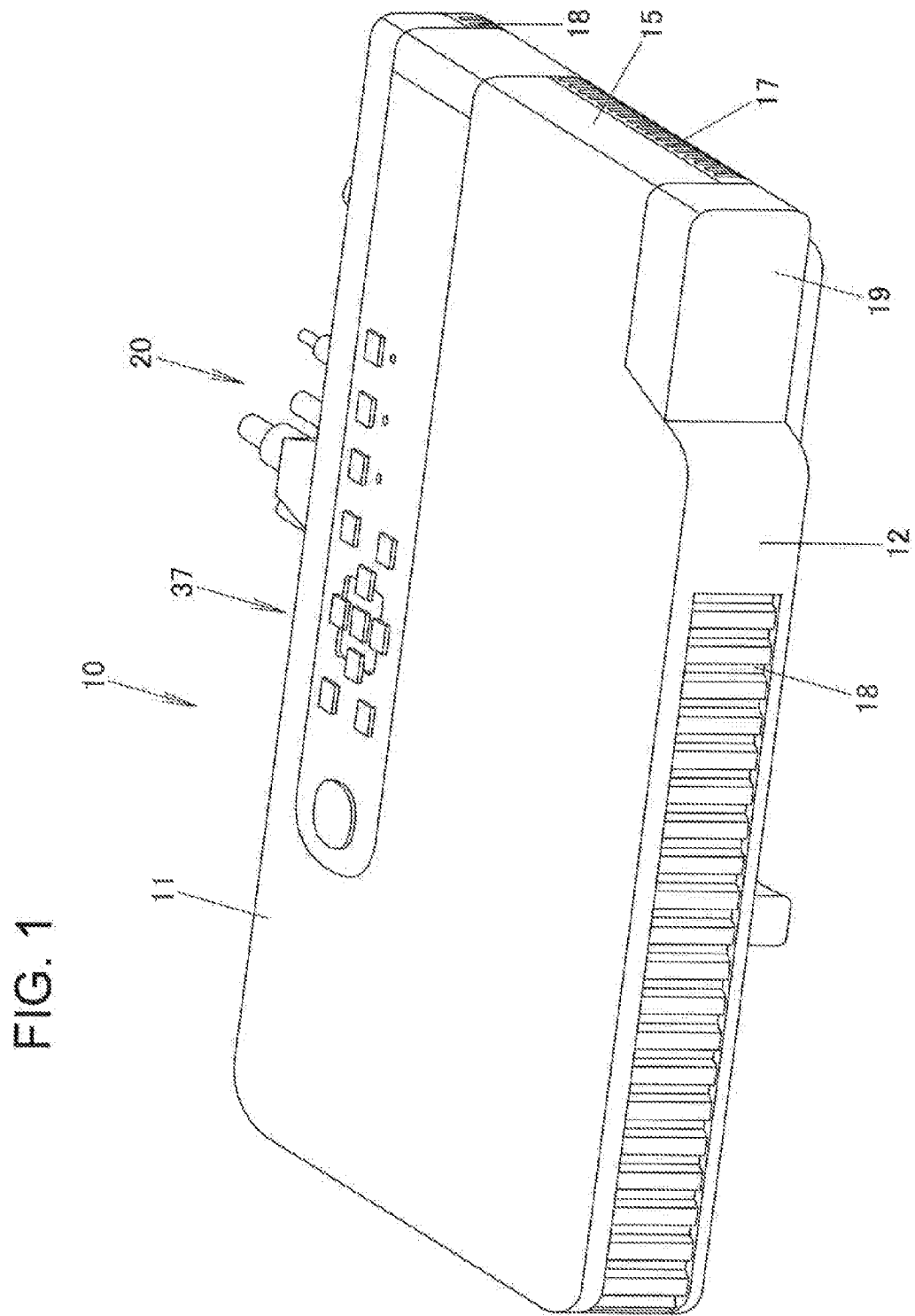
FIG. 1 is an external perspective view showing an example of a projector according to an embodiment of the invention.

Hereinafter, a best mode for carrying out the invention will be described based on the drawings. However, although embodiments which will be described below will be given various limitations which are technically preferable to carry out the invention, the scope of the invention is not limited to embodiments and illustrations which will be given below.

An embodiment of the invention will be described below. A projector 10 includes a light source unit 60 which is a light source unit according to the invention, a display element 51, a light source-side optical system 170 which guides light from the light source unit 60 to the display element 51, a projection-side optical system 220 which projects an image emitted from the display element 51 on to a screen, and a projector control unit which controls the light source unit 60 and the display element 51.

The light source unit 60 includes an excitation light shining device 70 which uses laser beam emitting elements which constitutes blue light sources, a green light source device which is a luminous light emitting device 100 which emits luminous light by using a laser beam emitted from the excitation light shining device 70, a red light source device 20, and a light guiding optical system 140.

The excitation light shining device 70 includes light sources 71 which shine laser beams in a blue wavelength range as excitation light on to a luminescent material layer 102 on a luminescent wheel 101 which is a rotary member and which emit diffuse light which has passed through a diffuse transmission portion made up of a diffusing plate which is provided on the luminescent wheel 101 as light in a blue wavelength range from the light source unit 60 and thus constitutes a blue light source device. In addition, the luminescent wheel 101 of the luminous light emitting device 100 which constitutes the green light source device has an arc-shaped luminous light emitting area where the luminescent material layer 102 made up of a green luminescent material is formed on a circular disk-shaped metal base and which emits light in a green wavelength range and diffuse transmission portions which are made up of diffusing plates 104a, 104b and which transmit light while diffusing it.

Further, the luminous light emitting device 100 has the light guiding optical system which includes mirrors 108, 109 and collective lenses 105, 106, 107, which are used to cause a laser beam which has passed through the first diffusing plate 104a which makes up the diffuse transmission portion of the luminescent wheel 101 to be incident on the diffuse transmission portion which is made up of the second diffusing plate 104b of the luminescent wheel 101 so that the laser beam is caused to pass through the diffuse transmission portion made up of the second diffusing plate 104b as a second passage through the diffuse transmission portion. Then, when the excitation light shining device 70 is illuminated, the luminous light emitting device 100 rotates the luminescent wheel 101.

Consequently, the laser beam which is the light in the blue wavelength range emitted from the excitation light shining device 70 passes through the first diffusing plate 104a and the second diffusing plate 104b which make up the diffuse transmission portions of the luminescent wheel 101 and is then emitted from the light source unit 60.

Additionally, in this luminous light emitting device 100, when the laser beam which is the light in the blue wavelength range emitted from the excitation light shining device 70 is incident on the luminescent material layer 102 on the luminescent wheel 101, light in the green wavelength range is emitted from a green luminescent material in the luminescent material layer 102 which absorbs the laser beam as excitation light. This light in the green wavelength range is emitted from the light source unit 60 via the light guiding optical system 140.

Further, the red light source device 120 has a red light emitting diode which is a semiconductor light emitting element which emits light in a red wavelength range as a red light source 121. The light guiding optical system 140 has a plurality of dichroic mirrors, the collective lenses and the like. The light guiding optical system 140 is configured so as to align axes of green light and red light which are emitted from the luminescent wheel 101 and the red light source device 120, respectively, with each other, so that the pencils of green light and red light are collected to an entrance plane of a light tunnel 175.

Then, a light source control device of the projector control unit controls individually the excitation light shining device 70 and the red light source device 120 of the light source unit 60 so as to emit the laser bean and the red light therefrom in the way described above, whereby combined light or monochromatic light can be emitted from the light source unit 60.

Hereinafter, an embodiment of the invention will be described in detail based on the accompanying drawings. FIG. 1 is an external perspective view of a projector 10. FIG. 1 is an external perspective view of a projector 10. In this embodiment, when left and right are referred to with respect to the projector 10, they denote, respectively, leftward and rightward directions with respect to an image projecting direction, and when front and rear are referred to with respect to the projector 10, they denote, respectively, forward and rearward directions of the projector 10 with respect to a direction towards a screen and the traveling direction of a pencil of light.

As is shown in FIG. 1, the projector 10 has a substantially rectangular parallelepiped shape. The projector 10 has a lens cover 19 which covers a projection port which lies to a side of a front panel 12 which is referred to as a front side panel of a projector casing. Additionally, a plurality of outside air inlet slits 18 are provided in the front panel 12. Further, although not shown, the projector 10 includes an Ir reception unit which receives a control signal from a remote controller.

In addition, a keys/indicators unit 37 is provided on an upper panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when the light source unit, the display element, a control circuit or the like overheats.

Further, provided in a back side or a back panel of the projector casing are an input/output connector unit where a USB terminals, a video signal input D-SUB terminal, an S terminal, an RCA terminal and the like are provided and various type of terminals 20 such as a power supply adaptor plug and the like. Additionally, a plurality of outside air inlet slits 18 are formed in the back panel. A plurality of inside air outlet slits 17 are formed in each of a right panel, not shown, which is a side panel of the projector casing and a left panel 15 which is a side panel shown in FIG. 1. In addition, outside air inlet slits 18 are also formed in a portion of the left panel 15 which lies in a corner portion formed between the back panel and the left panel 15. Further, a plurality of outside air inlet slits or inside air outlet slits are formed in a lower panel in positions near the front panel, the back panel, the left panel and the right panel.

Figure 2:
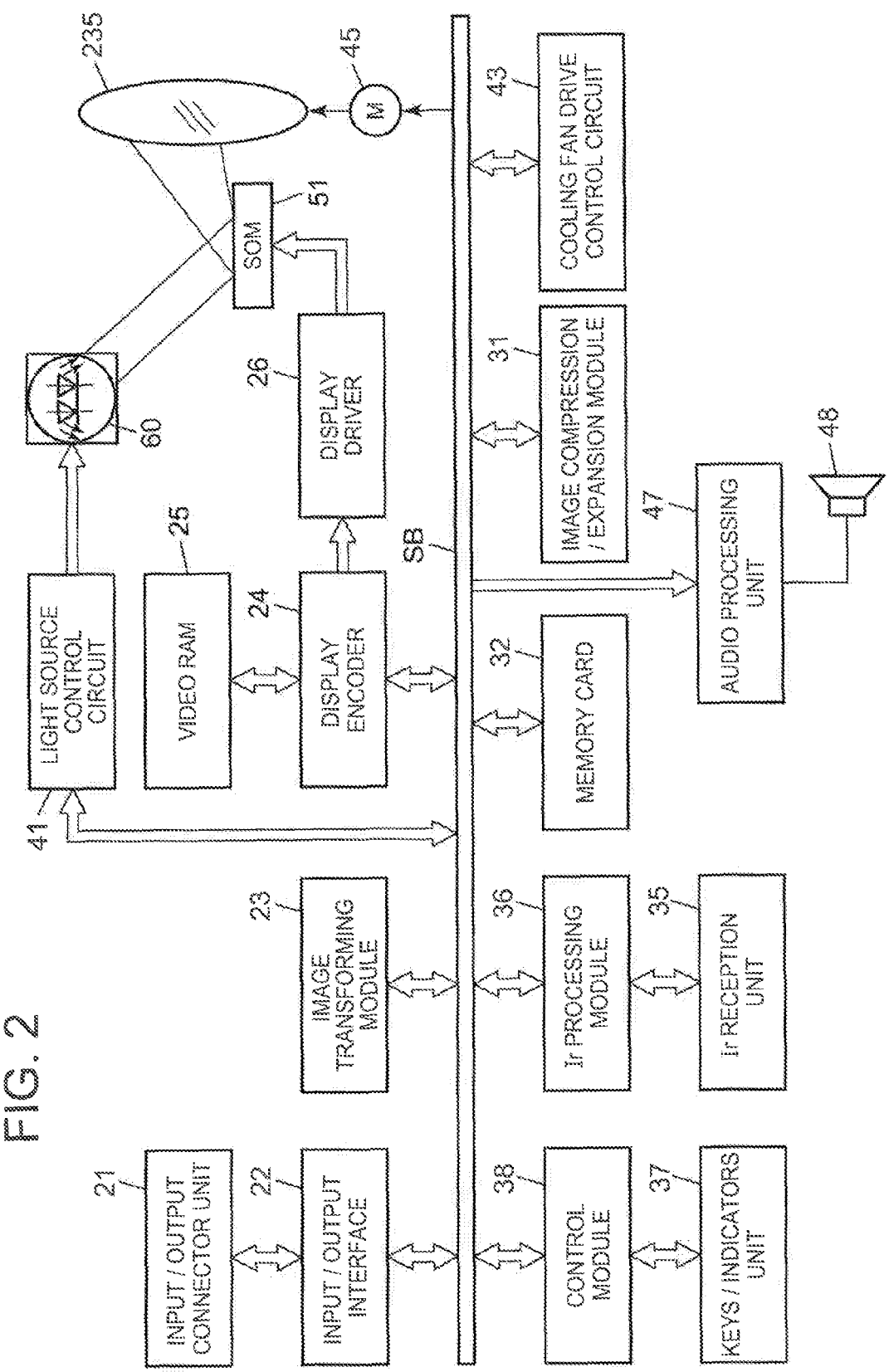
FIG. 2 is a block diagram showing an example of functional circuitry blocks of the projector according to the embodiment of the invention.

Next, a projector control unit of the projector 10 will be described by the use of a block diagram shown in FIG. 2. The projector control unit includes a control module 38, an input/output interface 22, an image transforming module 23, a display encoder 24, a display driver 26 and the like. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display element control module and drives a display element 51, which is a spatial optical modulator (SOM), at an appropriate frame rate in response to the image signal outputted from the display encoder 24.

Then, in this projector 10, a pencil of light which is emitted from a light source unit 60, which is a light source unit according to the invention, is shone onto the display element 51 via a light source-side optical system 170, which will be described later, to thereby form an optical image by using reflected light which is reflected by the display element 51. The image so formed is then projected on to a screen, not shown, for display thereon via a projection-side optical system 220, which will be described later. In addition, a movable lens group 235 of the projection-side optical system 220 is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion module 31 reads out image data recorded on the memory card 32 and expands individual image data which make up a series of dynamic images frame by frame. Then, the image data is outputted to the display encoder 24 via the image transforming module 23 so as to enable the display of dynamic images and the like based on the image data stored on the memory card 32.

The control module 38 governs the control of respective operations of circuitries within the projector 10 and is constituted by a CPU, a ROM which stores in a fixed fashion operation programs of various types of settings, a RAM which is used as a working memory and the like.

Operation signals generated at the keys/indicators unit 37 which is constituted by the main keys and indicators provided on the upper panel 11 of the projector casing are sent out directly to the control module 38. Key operation signals from the remote controller are received by the Ir reception unit 35, and a code signal demodulated at an Ir processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control device. This light source control circuit 41 controls individually, the excitation light shining device 70, the red light source device 120 and a blue light source device 130 of the light source unit 60 so as to emit light therefrom as required so that light in the predetermined ranges of wavelengths which is required when an image is generated is emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. Additionally, the control module 38 also causes the cooling fan drive control circuit 43 to keep the cooling fans rotating even after the power supply to a projector main body is switched off by use of a timer or the like. Alternatively, the control module 38 causes the cooling fan drive control circuit 43 to cut off the power supply to the projector main body depending upon the results of the temperature detections by the temperature sensors.

Figure 3:
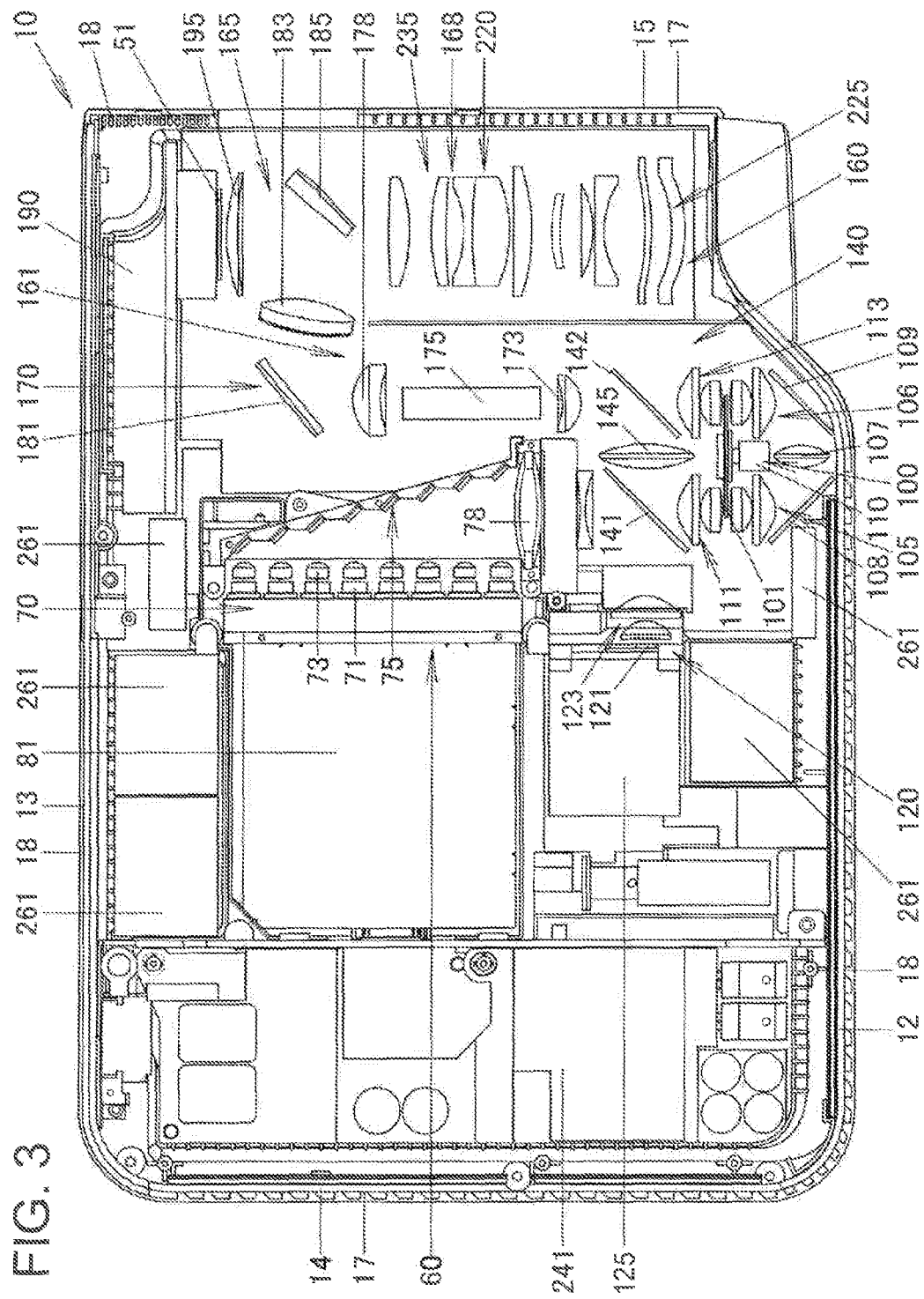
FIG. 3 is a schematic plan view showing an example of an internal construction of the projector according to the embodiment of the invention.

Next, an internal construction of the projector 10 will be described. FIG. 3 is a schematic plan view showing an internal construction of the projector 10. As shown in FIG. 3, the projector 10 includes a control circuit board 241 in proximity to a right panel 14. This control circuit board 241 includes a power supply circuit block, a light source control block and the like. Additionally, the projector 10 includes the light source unit 60 shown in FIG. 4, which is the light source unit according to the invention. The light source unit 60 is positioned to a side of the control circuit board 241, that is, in a substantially central portion of the projector casing.

Further, the projector 10 includes the light source-side optical system 170 and the projection-side optical system 220 between the light source unit 60 and the left panel 15. The projection-side optical system 220 is disposed along the left panel 15. The display element 51, which is a DMD and is also included in the projector 10, is disposed in proximity to the back panel 13 to the rear of the projection-side optical system 220. Thus, in the projector 10, light emitted from the light source unit 60 is guided to the display element 51 by the light source-side optical system 170.

Figure 4:
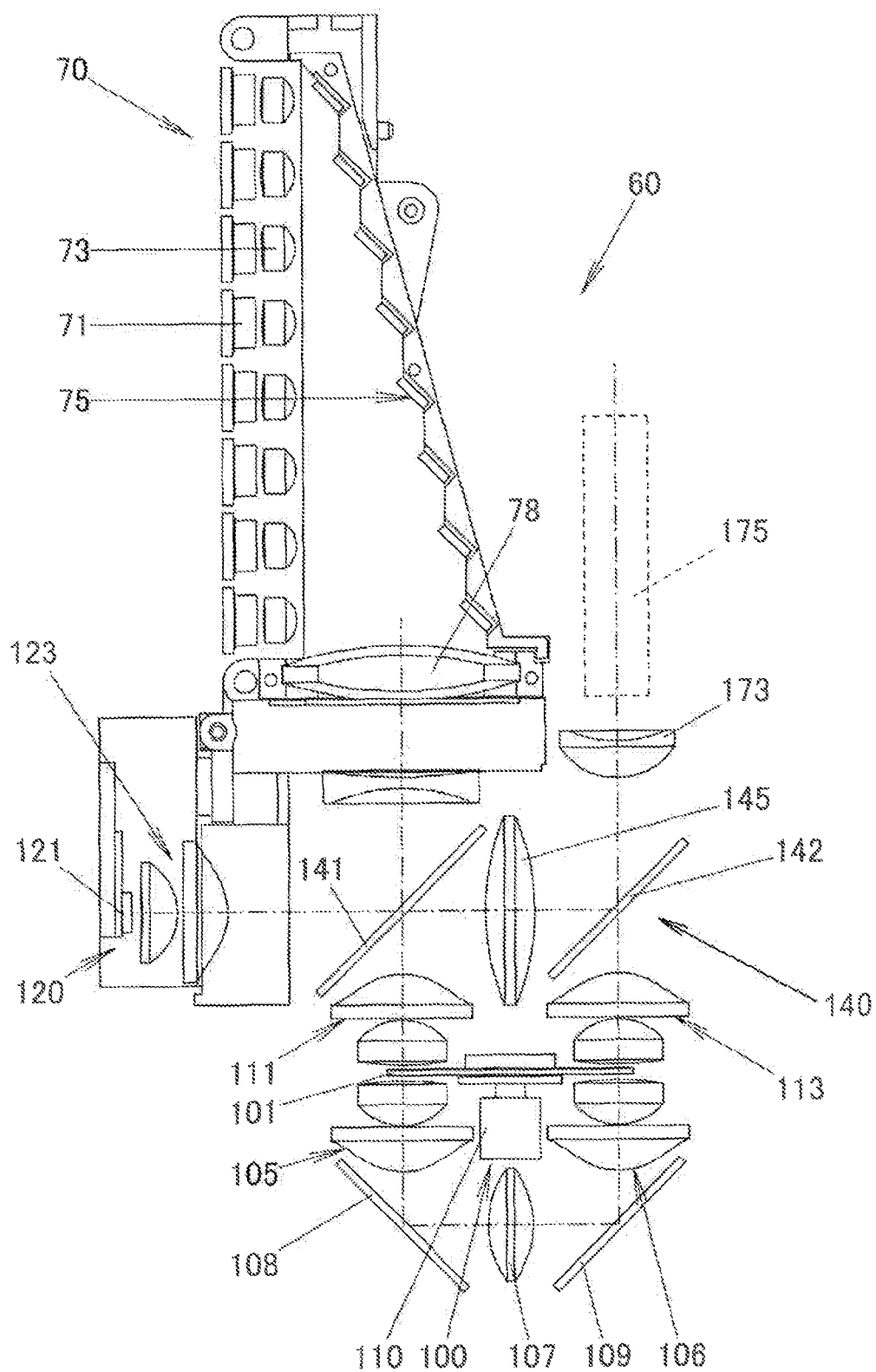
FIG. 4 is a schematic diagram showing an example of a construction of a light source unit according to the embodiment of the invention.

The light source unit 60 is disposed in a substantially laterally central portion to the projector main body as shown in FIGS. 3 and 4. The light source unit 60 includes an excitation light shining device 70 as a blue light source device which employs laser beam emitting elements and a luminous light emitting device 100 which functions as a green light source. The excitation light shining device 70 is disposed in proximity to the back panel 13, while the luminous light emitting device 100 is disposed in proximity to the front panel 12.

Further, the light source unit 60 includes a red light source device 120 and a light guiding optical system 140. The red light source device 120 is disposed between the excitation light shining device 70 and the luminous light emitting device 100 and emits light in such a way as to intersect a pencil of light emitted from the luminous light emitting device 100 at right angles. The light guiding optical system 140 changes the directions of axes of light in a blue wavelength range and light in a green wavelength range which are emitted from the luminous light emitting device 100 and light in a red wavelength range which is emitted from the red light source device 120 so as to align the axes of the blue light, the green light and the red light with each other, so that the blue, green and red light is collected to an entrance plane of a light tunnel 175.

Then, the excitation light shining device 70, which is the blue light source device, includes light sources 71 which is the laser beam emitting device, a group of reflection mirrors 75, a collective lens 78 and a heat sink 81 which is disposed between the light sources 71 and the right panel 14. The light sources 71 are disposed so that optical axes thereof become parallel to the back panel 13. The group of reflection mirrors 75 change axes of light beams emitted from the light sources 71 by 90 degrees in the direction of the front panel 12. The collective lens 78 collects the light beams emitted from the light sources 71 and reflected by the group of reflection mirrors 75.

The light sources 71 are constituted by a plurality of blue laser diodes which are arranged into a matrix configuration, and collimator lenses 73 are individually disposed on optical axes of the blue laser diodes so as to convert laser beams emitted from the individual blue laser diodes to parallel laser beams. In addition, in the group of reflection mirrors 75, a plurality of reflection mirrors are arranged like steps in a staircase so as to narrow sectional areas of pencils of light emitted from the light sources 71 in one direction for emission to the collective lens 78.

A cooling fan 261 is disposed between the heat sink 81 and the back panel 13, and the light sources 71 are cooled by the cooling fan 261 and the heat sink 81. Further, a cooling fan 261 is also disposed between the group of reflection mirrors 75 and the back panel 13, and the group of reflection mirrors 75 and the collective lens 78 are cooled by this cooling fan 261.

The luminous light emitting device 100 has a luminescent wheel 101, a rotary motor 110 and a light guiding system. The luminescent wheel 101 is a rotational member and has a rotational shaft which is parallel to the front panel 12, that is, parallel to an axis of excitation light. The luminescent wheel 101 is disposed so as to be at right angles to an axis of light emitted from the excitation light shining device 70. The rotational motor 110 is a wheel motor as a driving device for rotationally driving the luminescent wheel 101. The light guiding optical system includes a first mirror 108, a second mirror 109, a first collective lens 105, a second collective lens 106, and a middle collective lens 107 and the light guiding optical system shines light, which is passed through the luminescent wheel 101 and then emitted from a diffuse transmission portion of the luminescent wheel 101, on to other diffuse transmission portion of the luminescent wheel 101.

Figure 5:
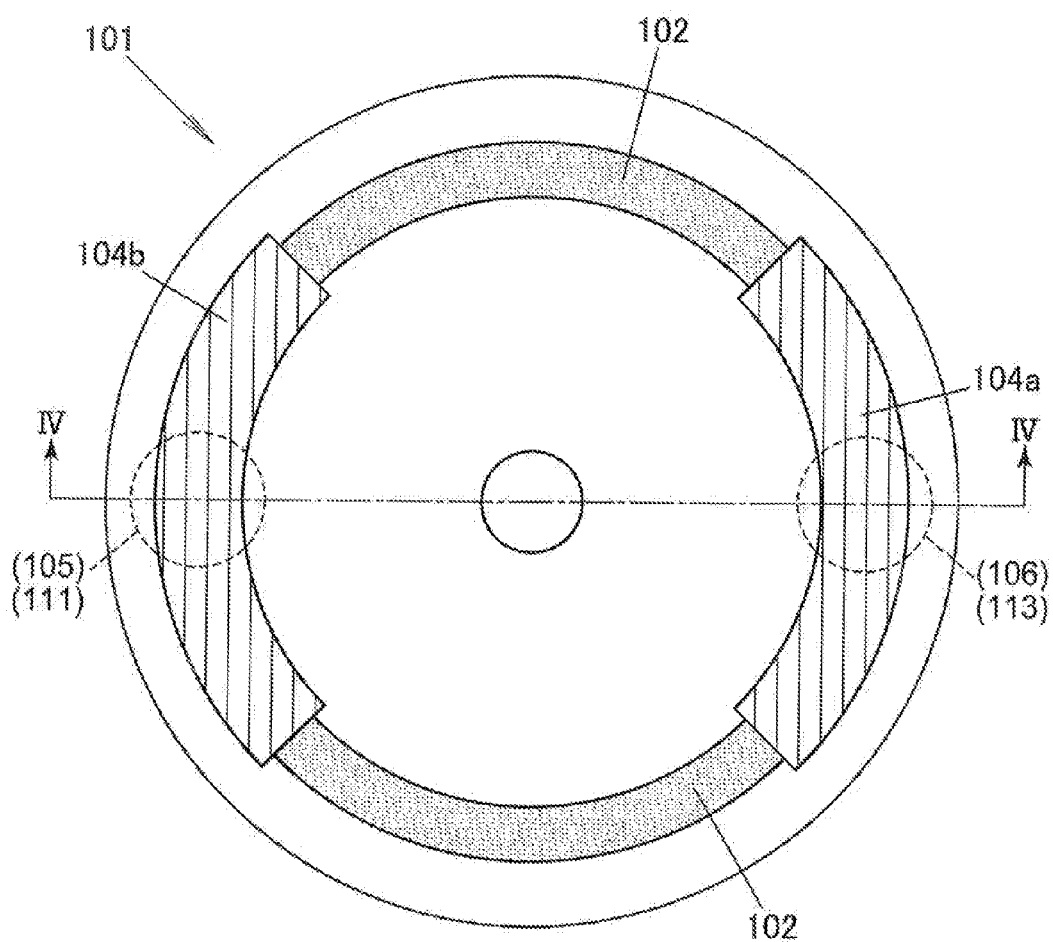
FIG. 5 is a front view showing an example of a luminescent wheel according to the embodiment of the invention.

As shown in FIG. 5, in the luminescent wheel 101, a first diffusing plate 104a and a second diffusing plate 104b are provided as diffuse transmission portions. Additionally, in the luminescent wheel 101, luminescent material layers 102 are provided on a surface of the luminescent wheel 101 which faces the back panel 13 or the excitation light shining device 70 in such a way as to be aligned with the diffuse transmission portions in an end-to-end fashion. In this luminescent wheel 101, the plurality of diffusing plates are moved so that entrance positions of light emitted from the excitation light shining device 70 to the individual diffusing plates change.

The first mirror 108 of the light guiding optical system is disposed in a position which lies on the axis of light emitted from the excitation light shining device 70 and closer to the front panel 12 than the luminescent wheel 101. This first mirror 108 reflects a laser beam which has passed through the first diffusing plate 104a which constitutes the diffuse transmission portion of the luminescent wheel 101 in such away that the axis of the laser beam becomes substantially parallel to the front panel. The first collective lens 105 of the light guiding system collects a diffuse laser beam which has passed through the first diffusing plate 104a of the luminescent wheel 101 to shine it to the first mirror 108. Then, the laser beam reflected at the first mirror 108 is collected by the middle collective lens 107 and is then shone on to the second mirror 109. Then, the laser beam is reflected at the second mirror 109, and the reflected laser beam is then collected by the second collective lens 106 to be shone on to the second diffusing plate 104b of the luminescent wheel 101.

Then, the diffuse laser beam passes through the second diffusing plate 104b which is disposed in a position which faces the first diffusing plate 104a and is emitted to the back panel 13 side of the luminescent wheel 101. Then, the laser beam so emitted is then collected by a collective lens 113 to be incident on a second dichroic mirror 142.

The laser beam from the excitation light shining device 70 is incident on the second diffusing plate 104b when the luminescent wheel 101 rotates half a full rotation. The laser beam which has passed through the second diffusing plate 104b is then incident on the first diffusing plate 104a via the light guiding system and passes through the first diffusing plate 104a to be emitted to the back panel 13 side of the luminescent wheel 101. Thus, the laser beam from the excitation light shining device 70 is caused to pass through the diffuse transmission portion as a second passage and is then collected by the collective lens 113.

In this way, the laser beam which is caused to pass through one of the diffuse transmission portions of the luminescent wheel 101 by the light guiding optical system is also caused to be incident on the other diffuse transmission portion of the luminescent wheel 101 and then passes therethrough to be diffused. Because of this, the green light source device includes the collective lens 113 which collects a pencil of light which is emitted in the direction of the back panel 13 from the luminescent wheel 101.

In addition, the luminescent material layers 102 are formed on the surface of the luminescent wheel 101 which faces the excitation light shining device 70. A laser beam which is emitted from the excitation light shining device 70 is caused to be incident on the luminescent material layers 102 via a first dichroic mirror 141 of the light guiding system 140 and a collective lens 111 which is incorporated in the green light source. When the laser beam is incident on the luminescent material, the luminescent material is excited by the laser beam to thereby emit light in the green wavelength range.

As shown in FIG. 5, the luminescent wheel 101 is a circular disk-shaped metal base, and arc-shaped luminous light emitting areas are formed thereon as depressed portions. Then, a green luminescent material is applied to the depressed portions so as to form the luminescent material layers 102. Thus, when laser beams are emitted from the light sources 71 to be incident on the green luminescent materials in the luminescent material layers 102 as excitation light, luminous light in the green wavelength range is emitted from the luminescent material layers 102. It is noted that these luminescent material layers 102 are formed on the side of the luminescent wheel 101 which faces the back panel 13 of the projector 10 when the luminescent wheel 101 is placed in the projector 10. Then, the first diffusing plate 104a and the second diffusing plate 104b which make up the diffuse transmission portions which transmit light in a diffused fashion are disposed in the circumferential direction so as to be aligned with the luminescent material layers 102 which are configured as the luminous light emitting areas in the end-to-end fashion.

In FIG. 5, broken lines denote a position which corresponds to the positions where the first collective lens 105 and the collective lens 111 are disposed and a position which corresponds to the positions where the second collective lens 106 and the collective lens 113 are disposed. A view corresponding to a sectional view of the luminescent wheel 101 taken along the line IV-IV in FIG. 5 is the plan view shown in FIG. 4 which shows schematically the light source unit 60.

Additionally, the first diffusing plate 104a and the second diffusing plate 104b are formed into the diffusing plates by forming fine irregularities at random on a surface of a transparent base which can transmit light through sandblasting or the like. The first diffusing plate 104a and the second diffusing plate 104b have the same size and the same arc-like shape and are disposed in symmetric positions with respect to a rotational center of the luminescent wheel 101. Then, the arc-shaped luminescent material layers 102, which is centered at the rotational center of the luminescent wheel 101, are formed on a circumferential edge of the luminescent wheel 101 between the first diffusing plate 104a and the second diffusing plate 104b in the end-to-end fashion.

A front surface 12 side surface of the luminescent wheel 101 where the luminous light emitting areas are formed is mirror finished through silver deposition or the like whereby a reflecting surface is formed which reflects light. The luminescent material layers 102 which include the green luminescent material are laid on this reflecting surface.

Then, light emitted from the excitation light shining device 70 to be shone on to the green luminescent material layers 102 of the luminescent wheel 101 excites the green luminescent material in the green luminescent material layers 102, whereby pencils of light are emitted in every direction in a luminescent fashion from the green luminescent material. The pencils of light so emitted are directed directly towards the back panel 13 or are directed towards the back panel 13 after they are reflected on the reflecting surface of the luminescent wheel 101. Additionally, the excitation light which is shone on to the metal base without being absorbed by the luminescent material in the luminescent material layers 102 is reflected by the reflecting surface and is then incident on the luminescent material layers 102 to thereby excite the luminescent material layers 102.

Consequently, by using the surfaces of the depressed portions in the luminescent wheel 101 as the reflecting surface, the utilization efficiency of the excitation light which is emitted from the light sources 71 can be enhanced, which can illuminate the luminescent material layers 102 more brightly. Then, luminous light emitted from the luminescent material layers 102 is collected by the collective lens 111 and is then emitted from the light source unit 60 by the light guiding optical system 140.

A laser beam which is incident on the first diffusing plate 104a or the second diffusing plate 104b passes through the diffuse transmission portion and is then incident on the other diffuse transmission portion by way of the collective lenses and the like of the light guiding optical system. Therefore, the laser beam is emitted towards the back panel 13 from a point on the luminescent wheel 101 which is offset 180 degrees from and which is symmetrical with the position on the luminescent wheel 101 where the laser beam is incident with respect to the rotational center of the luminescent wheel 101.

The red light source device 120 includes the red source 121 which is disposed so that the optical axis thereof becomes parallel to the light sources 71 and a collective lens 123 which collects light emitted from the red light source 121. Additionally, this red light source device 120 is disposed so that the optical axis thereof intersects light emitted from the excitation light shining device 70 and light in the green wavelength range which is emitted from the luminescent wheel 101 at right angles. The red light source 121 is a red light emitting diode as a semiconductor light emitting element which emits light in the red wavelength range. Further, the red light source device 120 includes a heat sink 125 which is disposed at a side of the red light source 121 which faces the right panel 14. Additionally, a cooling fan 261 is disposed between the heat sink 125 and the front panel 120, and the red light source 121 is cooled by this cooling fan 261.

The light guiding optical system 140 includes a collective lens which collects pencils of light in the red, green and blue wavelength ranges, the dichroic mirrors which change the directions of axes of the pencils of light in the individual wavelength ranges so as to be aligned with one another and the like. Specifically, the first dichroic mirror 141 is disposed in a position where the axes of light in the blue wavelength range emitted from the excitation light shining device 70 and light in the green wavelength range emitted from the luminescent wheel 101 intersect the axis of light in the red wavelength range emitted from the red light source device 120 at right angles. This first dichroic mirror 141 transmits light in the blue wavelength range and light in the red wavelength range and reflects light in the green wavelength range, changing the axis of the green light by 90 degrees in the direction of the left panel 15.

In addition, the second dichroic mirror 142 is disposed in a position where the axis of light in the blue wavelength range which is emitted from the position on the luminescent wheel 101 which is symmetrical with the position on the luminescent wheel 101 on which a laser beam from the excitation light shining device 70 is incident intersects the axis of light in the red wavelength range emitted from the red light source device 120 at right angles. This second dichroic mirror 142 transmits light in the blue wavelength range and reflects light in the green wavelength range and light in the red wavelength range, changing the axes of the green light and the red light by 90 degrees in the direction of the back panel 13. Additionally, a collective lens 145 is disposed between the first dichroic mirror 141 and the second dichroic mirror 142.

The light source-side optical system 170 includes the light tunnel 175 which distributes uniformly the intensity of a pencil of light emitted from the light source unit 60, a collective lens 173 which collects light from the light source unit 60 to the entrance of the light tunnel 175, a collective lens 178 which collects light emitted from the light tunnel 175, a light axis changing mirror 181 which changes the axis of a pencil of light emitted from the collective lens 178 by 90 degrees in the direction of the left panel 15, a collective lens 183 which collects the light from the light source unit 60 which is reflected on the light axis changing mirror 181 to the display element 51, and a shining mirror 185 which shines a pencil of light which has emanated from the collective lens 183 at a predetermined angle towards the display element 51. Consequently, the light from the light source is shone on to the display element 51, which is the DMD, by the shining mirror 185 of the light source-side optical system 170, and the display element 51 is driven and controlled by the display driver 26 so as to cause "on" light to be incident on the projection-side optical system 220.

A collective lens 195, which is a constituent member of the projection-side optical system 220, is disposed in proximity to the front of the display element 51. A heat sink 190 is disposed between the display element 51 and the back panel 13, and the display element 51 is cooled by this heat sink 190.

The projector 10 includes a lens group of the projection-side optical system 220 which is disposed along the left panel 15, and the "on" light reflected on the display element 51 is projected on to a screen by this lens group. The projection-side optical system 220 includes a fixed lens group 225 which is incorporated in a fixed barrel and the movable lens group 235 which is incorporated in a movable barrel and the movable lens group 235 is moved by the lens motor for zooming and focusing, thereby the projection-side optical system 220 functions as a variable-focal length type lens having a zooming function.

Consequently, the flashing operations of the excitation light shining device 70 and the red light source device 120 are individually time-sharing controlled by the light source control device to thereby emit combined light or monochromatic light from the light source unit 60. Then, the DMD, which is the display element 51 of the projector 10, time-sharing displays light beams of the individual colors according to the data, thereby making it possible to generate a highly bright color image on the screen.

The light source unit according to the invention emits the light in the blue wavelength range which passes through the first diffusing plate 104a and the second diffusing plate 104b which are disposed on the luminescent wheel 101 which is the rotary member. Then, when projection image light is formed by the light in the blue wavelength range which is the coherent laser beam to project an image on to the screen, a projected image which is free from speckle noise or which includes extremely little speckle noise can be formed on the screen by the projector 10.

A light source unit 60 according to another embodiment of the invention will be described below. In this light source unit 60, as shown in FIG. 6, a first diffusing plate 104a and a second diffusing plate 104b may be formed on a luminescent wheel 101 which is a rotary member so as to have a larger area than that of the first and second diffusing plates 104a, 104b of the previous embodiment.

The first diffusing plate 104a and the second diffusing plate 104b have the same arc-like shape and the same size and constitute diffuse transmission portions which are disposed in point symmetry with respect to a rotation center of the luminescent wheel 101.

The diffuse transmission portions are provided in two locations on a circumferential edge of the luminescent wheel 101, and arc-shaped luminescent material layers 102, which are centered at the rotation center of the luminescent wheel 101, are respectively formed between the diffuse transmission portions so as to align with the diffuse transmission portions in the circumferential direction and in an end-to-end fashion. A green luminescent material is applied to each of the luminescent material layers 102, and as with the luminescent material in the previous embodiment, this luminescent material generates light in a green wavelength range. Additionally, broken lines denote positions which correspond individually to positions where a first collective lens 105 and a collective lens 111 are disposed, positions where a second collective lens 106 and a collective lens 151 are disposed and positions where a collective lens 155 and a collective lens 161 are disposed, these collective lenses being described later.

Figure 6:
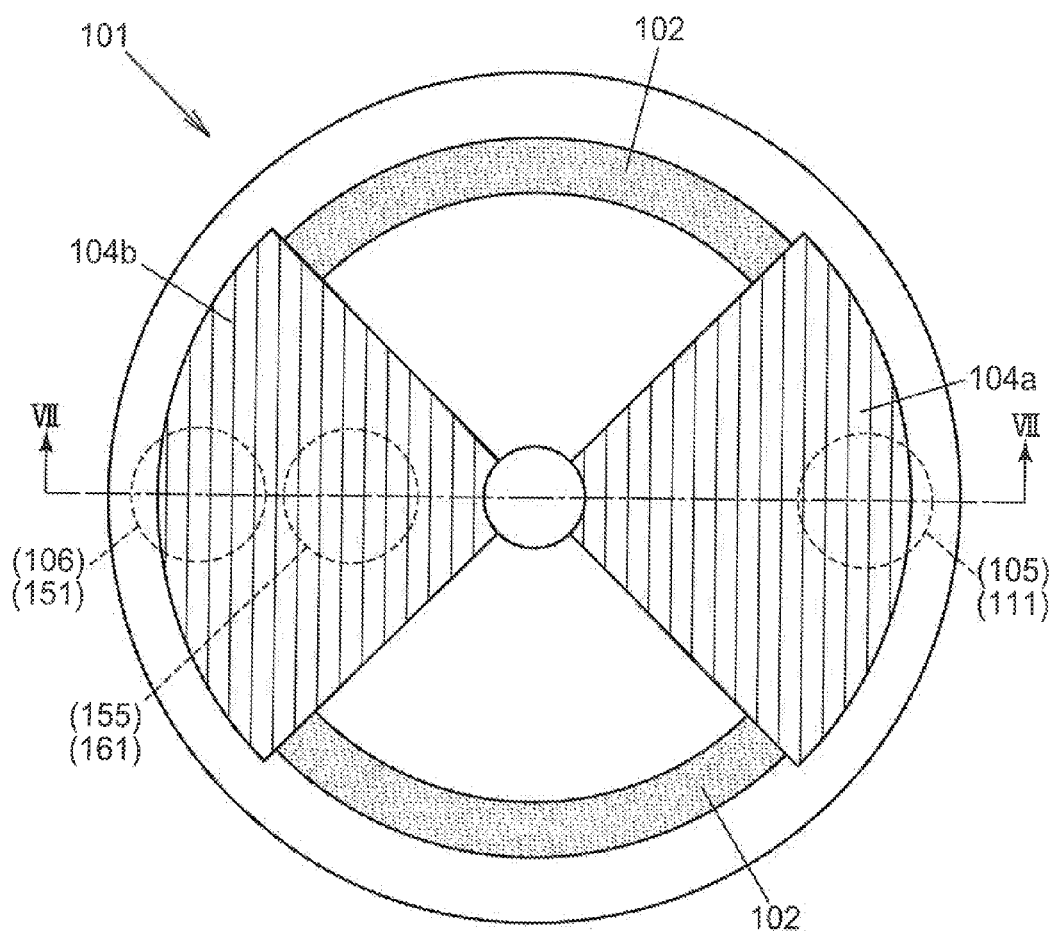
FIG. 6 is a front view showing an example of a luminescent wheel according to an additional embodiment of the invention.
Figure 7:
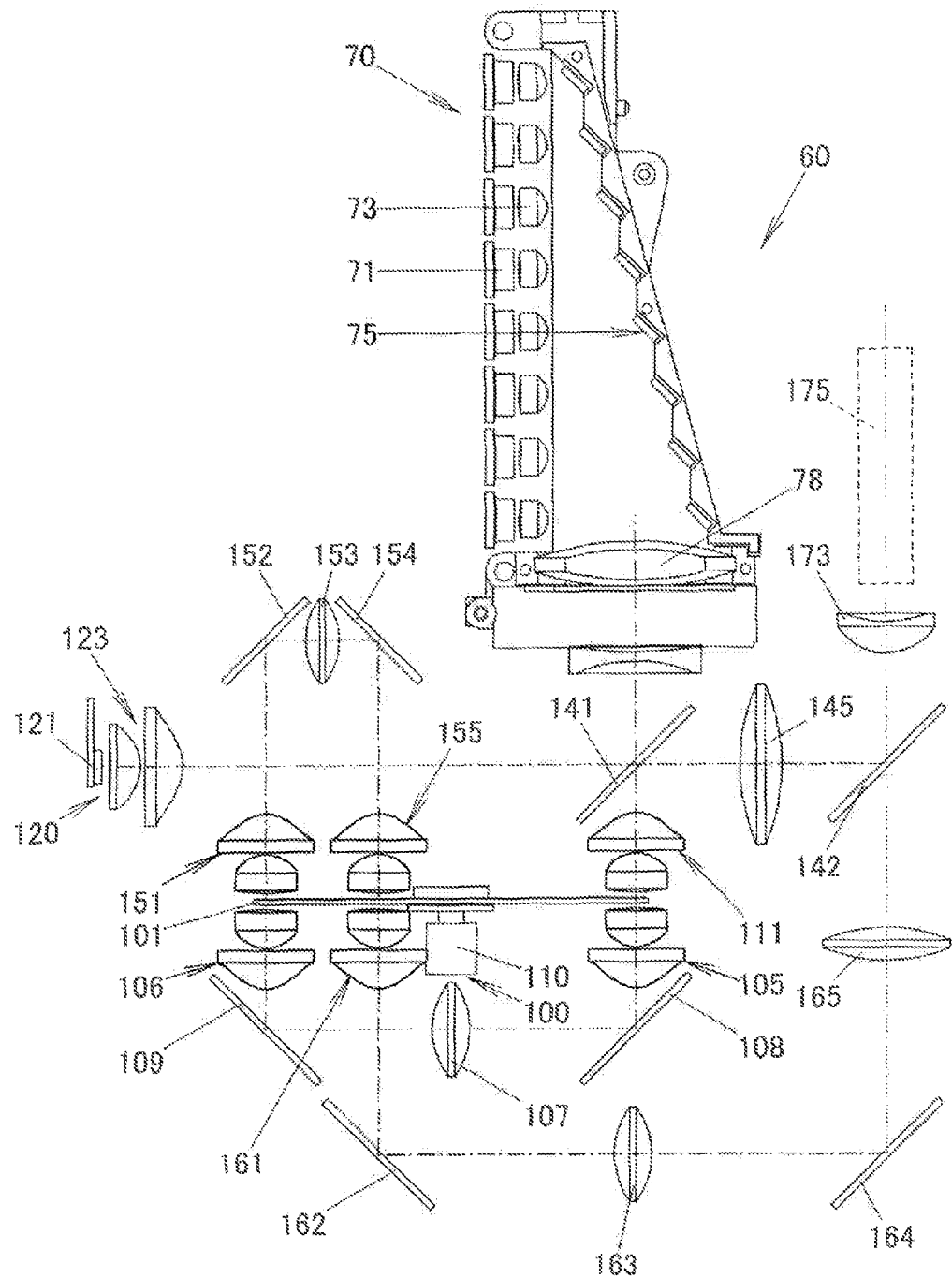
FIG. 7 is a schematic diagram showing an example of a construction of a light source unit according to the additional embodiment of the invention.

In addition, a view corresponding to a sectional view taken along the line VII-VII in FIG. 6 is a schematic plan view of the light source unit 60 shown in FIG. 7.

In a luminous light emitting device 100 which employs this luminescent wheel 101 and a blue light source device in which laser beam emitting elements are used as light sources 71, as shown in the schematic plan view of FIG. 7, the first collective lens 105 and a first mirror 108 are disposed on a front panel 12 side of the luminescent wheel 101. Then, a diffuse laser beam which is emitted from an excitation light shining device 70 and then passes through the diffuse transmission portion, that is, the first diffusing plate 104a of the luminescent wheel 101 is collected by the first collective lens 105 and is reflected in a direction which is substantially parallel to the front panel 12 by the first mirror 108. The luminous light emitting device 100 also includes, on the front panel 12 side of the luminescent wheel 101, a second mirror 109 which causes the light which is reflected by the first mirror 108 to be incident on the diffuse transmission portion, that is, the second diffusing plate 104b which is offset 180 degrees from the first diffusing plate 104a on the luminescent wheel 101, the second collective lens 106 which collects the light which is shone on to that diffuse transmission portion, and a middle collective lens 107 which is disposed between the first mirror 108 and the second mirror 109.

Further, the luminous light emitting device 100 includes, on a back panel 13 side of the luminescent wheel 101, the collective lens 151 which collects the laser beam which has passed through the diffuse transmission portion which is offset 180 degrees from the diffuse transmission portion through which the laser beam passed first after it had been emitted from the excitation light shining device 70, a third mirror 152 which reflects the laser beam which has been emitted to the back side panel 13 side of the luminescent wheel 101 in a direction which is substantially parallel to the front panel 12, a middle collective lens 153, a fourth mirror 154 which reflects the laser beam which is made substantially parallel to the front panel 12 towards the front panel 12 again to cause the laser beam to be incident on the second diffusing plate 104b again, and the collective lens 155. As this occurs, as shown in FIG. 6, the laser bean is incident on a position on the second diffusing plate 104b which is different from the position where the laser beam was incident first.

Additionally, the luminous light emitting device also includes the collective lens 161 which collects the laser beam which has passed through the second diffusing plate 104b to the front panel 12 side of the luminescent wheel 101, a fifth mirror 162 which reflects the laser beam which has passed through the collective lens 161 in a direction which is substantially parallel to the front panel 12, a middle collective lens 163 which collects the laser beam which is made substantially parallel to the front panel 12, a sixth mirror 164 which reflects the laser beam which has passed through the middle collective lens 163 in the direction of the back panel 13 to cause the laser beam to be incident on the second dichroic mirror 142 of the light guiding optical system 140, and a collective lens 165 which collects a bundle of rays of light in the blue wavelength range to be incident on the second dichroic mirror 142 while controlling the bundle of blue light rays.

Here, the second collective lens 106, the collective lens 151, the second mirror 109 and the third mirror 152 are referred altogether to as a second diffusing plate optical system group, and the collective lens 155, the collective lens 161, the fifth mirror 162 and the fourth mirror 154 are referred altogether to as a third diffusing plate optical system group.

In this way, the luminous light emitting device 100 includes, as a light guiding system, the six reflection mirrors and the collective lenses as required. This configuration allows the laser beam to pass through the first diffusing plate 104a which is disposed on the luminescent wheel 101 once and to pass through the second diffusing plate 104b on the luminescent wheel 101 twice, allowing the laser beam to pass through the diffusing plates three times. Thus, the luminous light emitting device 100 and hence the light source unit 60 can form the light source light which can form, in turn, a projection image which has less speckle noise.

Figure 8:
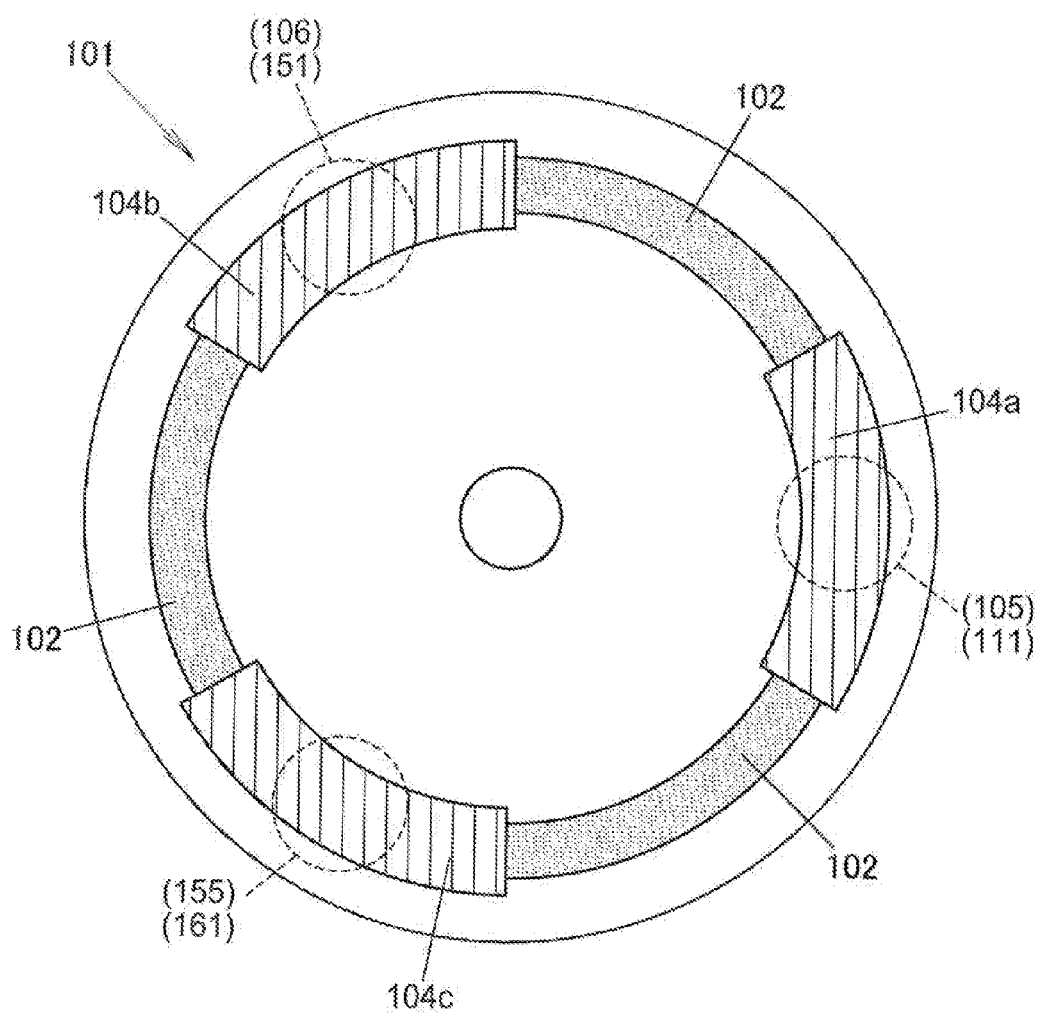
FIG. 8 is a front view showing an example of a luminescent wheel according to a further embodiment of the invention.

A light source unit 60 according to a further embodiment of the invention will be described below. In this light source unit 60, as shown in FIG. 8, in addition to a first diffusing plate 104a and a second diffusing plate 104b, a third diffusing plate 104c is disposed on a luminescent wheel 101.

The first diffusing plate 104a, the second diffusing plate 104b and the third diffusing plate 104c have the same arc-like shape and the same size and constitute diffuse transmission portions which are positioned in the circumferential direction on the luminescent wheel 101 in point symmetry about a rotation center of the luminescent wheel 101 while being offset 120 degrees from one another.

Arc-shaped luminescent material layers 102, which are centered at the rotation center of the luminescent wheel 101, are respectively formed between the diffuse transmission portions which are provided in the three locations on a circumferential edge of the luminescent wheel 101 so as to align with the diffuse transmission portions in the circumferential direction and in an end-to-end fashion. A luminescent material applied to each of these luminescent material layers 102 emits light in the green wavelength range as the luminescent materials of the previous embodiments do. Additionally, broken lines denote positions which correspond to positions where a first collective lens 105 and a collective lens 111 are disposed, positions where a second collective lens 106 and a collective lens 151 are disposed, and positions where a collective lens 155 and a collective lens 161 are disposed, these collective lenses being described later.

A luminous light emitting device 100 of a blue light source device in which laser beam emitting elements are used as light sources 71 is shown in a schematic plan view of FIG. 9. It is noted that configurations in FIG. 9 like to those shown in FIG. 7 will be given same reference numerals to those shown in FIG. 7 for description.

In the luminous light emitting device 100, the first collective lens 105 and a first mirror 108 are disposed on a front panel 12 side of the luminescent wheel 101. Then, a diffuse laser beam which is emitted from an excitation light shining device 70 and then passes through the diffuse transmission portion of the luminescent wheel 101 is collected by the first collective lens 105 and is reflected in a direction which is substantially parallel to the front panel 12 by the first mirror 108. The luminous light emitting device 100 also includes, on the front panel 12 side of the luminescent wheel 101, a second mirror 109 which causes the light which is reflected by the first mirror 108 to be incident on the diffuse transmission portion which is offset 120 degrees from the first diffuse transmission portion on the luminescent wheel 101, the second collective lens 106 which collects the light which is shone on to that diffuse transmission portion, and a middle collective lens 107 which is disposed between the first mirror 108 and the second mirror 109.

Further, the luminous light emitting device 100 includes, on a back panel 13 side of the luminescent wheel 101, the collective lens 151 which collects the laser beam which has passed through the diffuse transmission portion which is offset 120 degrees from the diffuse transmission portion through which the laser beam passed first after it had been emitted from the excitation light shining device 70, a third mirror 152 which reflects the laser beam which has been emitted to the back side panel 13 side of the luminescent wheel 101 in a direction which is substantially parallel to the front panel 12, a middle collective lens 153, a fourth mirror 154 which reflects the laser beam which is made substantially parallel to the front panel 12 towards the front panel 12 again to cause the laser beam to be incident on a position on the luminescent wheel 101 which is offset 120 degrees from the position where the laser beam was first incident on the luminescent wheel 101 after the laser beam had been emitted from the excitation light shining device 70 so that the laser beam is incident on the third diffuse transmission portion, and the collective lens 155.

Additionally, the luminous light emitting device 100 includes the collective lens 161 which collects the laser beam which has passed through the third diffuse transmission portion, a fifth mirror 162 which reflects the laser beam which has passed through the collective lens 161 in a direction which is substantially parallel to the front panel 12, a middle collective lens 163 which collects the laser beam which is made substantially parallel to the front panel 12, a sixth mirror 164 which reflects the laser beam which has passed through the middle collective lens 163 in the direction of the back panel 13 to cause the laser beam so reflected to be incident on a second dichroic mirror 142 of the light guiding optical system 140, and the collective lens 165 which collects a bundle of rays of light in the blue wavelength range to be incident on the second dichroic mirror 142 while controlling the bundle of blue light rays.

Further, also here, the second collective lens 106, the collective lens 151, the second mirror 109 and the third mirror 152 are referred altogether to as a second diffusing plate optical system group, and the collective lens 155, the collective lens 161, the fifth mirror 162 and the fourth mirror 154 are referred altogether to as a third diffusing plate optical system group.

In FIG. 9, to describe an optical path along which light from the excitation light shining device 70 passes through the luminescent wheel 101 and is incident on the light tunnel 175, the second diffusing plate optical system group and the second diffusing plate 104b are depicted as being aligned with the third diffusing plate optical system group and the third diffusing plate 104c on the plane in FIG. 9. Additionally, the middle collective lens 153 is depicted as being disposed between the third mirror and the fourth mirror on the plane in FIG. 9, and the various mirrors are also depicted as not being inclined towards a far side or a near side in FIG. 9.

However, in the configuration of this embodiment, in reality, the second diffusing plate and the third diffusing plate are disposed so as to overlap each other in the plan view of FIG. 9. The middle collective lens 153 is disposed so as to overlap the third mirror and the fourth mirror in the plan view of FIG. 9. The second diffusing plate optical system group and the third diffusing plate optical system group are disposed so as to overlap each other in the plan view of FIG. 9. In addition, the various mirrors are disposed so as to be inclined to the far side or the near side in the plan view of FIG. 9.

In this way, the luminous light emitting device 100 includes, as a light guiding system, the six reflection mirrors and the collective lenses as required. This configuration allows the laser beam to pass sequentially through the three diffusing plates of the first diffusing plate 104a, the second diffusing plate 104b, and the third diffusing plate 104c which are respectively disposed on the luminescent wheel 101. Thus, the luminous light emitting device 100 and hence the light source unit 60 can form the light source light which can form, in turn, a projection image which has less speckle noise. Additionally, by adopting this configuration, a period of time during which blue light is emitted and a period of time during which green light is emitted can be formed continuously in a short cycle within an image of one frame without on/off controlling the laser beam from the excitation light shining device 70, and therefore, it is possible to suppress the occurrence of a color breaking phenomenon without on/off controlling the light sources.

A laser beam shone from the excitation light shining device 70 passes through a diffusing plate, and the laser beam which has passed through the diffusing plate one time may be caused to pass through the same diffusing plate in an area other than the area where the laser beam has already passed. Namely, a configuration may be adopted in which a laser beam is incident on a first area of a diffusing plate and the diffuse light emitted from the first area is then incident on a second area of the diffusing plate which differs from the first area to be incident on the light tunnel 175 thereafter.

There are often occurring cases where reflection prisms are used for the reflection mirrors of the light guiding system. In this configuration, the middle collective lens is omitted, and two mirrors which hold the middle collective lens is replaced with a reflection prism. Thus, the number of components of the light guiding system is reduced, facilitating the assemblage of the light guiding system from time to time.

In this way, in the light source unit according to the invention, light in the blue wavelength range from the excitation light shining device 70 which is the blue light source device is caused to pass through the diffuse transmission portions made up of the arc-shaped diffusing plates a plurality of times and is then emitted from the light source unit 60. Therefore, when a projection image is formed by the light in the blue wavelength range to project the image formed on to the screen, the projector 10 can form a projected image which is free of speckle noise or which has extremely little speckle noise on the screen. Thus, the light source unit according to the invention becomes suitable for the projector 10.

Then, the diffuse transmission portions are formed on the circular disk-shaped luminescent wheel 101 which is the rotary member. In the event that this luminescent wheel 101 is rotated by a rotary motor 110 which is a driving device so that all the diffuse transmission portions rotationally move altogether, the light source unit can be formed into a light source unit which is small in size and light in weight and which can continuously control the movement of the diffuse transmission portions with ease.

In addition, the diffuse laser beams emitted from the diffuse transmission portions on the luminescent wheel 101 are collected by the collective lenses, and therefore the light source light can be made use of effectively without being wasted.

Further, when the laser beams are caused to be incident on the diffuse transmission portions made up of the diffusing plates, the laser beams are collected by the collective lenses for incidence thereon. Thus, not only can the light source light be made use of effectively, but also an incident point where the laser beam is incident on each diffusing plate can be made small. This enables the moving diffusing plates to be narrowed in width, and hence, the light source unit can be made small in size and light in weight.

Additionally, the diffusing plates are provided on the circular disk-shaped rotational member, and the luminescent material layers are formed between the diffusing plates in the end-to-end fashion. Thus, it is possible to generate light in a wavelength range which differs from the wavelength range of the laser beam which is emitted from the light source device.

In addition, the diffusing plates and the luminescent material layers are provided in the end-to-end fashion along the circumferential edge of the circular disk-shaped rotational member. Thus, the movement of the diffusing plates and the shining of the laser beam to the diffusing plates and the luminescent material layers can be easily switched continuously by the rotation of the rotational member.

Then, the light sources 71 emit the laser beams in the blue wavelength range, and the luminescent material in the luminescent material layers emits the luminous light in the green wavelength range. Thus, the light source unit can easily constitute the high-intensity light source.

In addition, the invention is not limited to the embodiments that have been described heretofore, and hence, the invention can be modified variously in various steps in carrying out the invention without departing from the spirit and cope thereof. Additionally, as many functions which are carried out in the embodiments as possible may be combined together as required. Various stages at which the invention is carried out are included in the embodiments that have been described above, and various inventions can be extracted by combining a plurality of disclosed constituent factors. For example, as long as the expected advantage can be obtained even in the event that some of the whole constituent factors that are disclosed in the embodiments are deleted, the configuration from which those constituent factors are deleted can be extracted as an invention.

What is claimed is:

1. A light source unit comprising:
a light source which emits a laser beam;
a plurality of diffusing plates on which the laser beam is incident and which emit the laser beam incident thereon as diffuse light; and
a driving mechanism which moves the plurality of diffusing plates,
wherein the laser beam from the light source is incident on one diffusing plate of the plurality of diffusing plates, and diffuse light emitted from the one diffusing plate is incident on the other diffusing plate of the plurality of diffusing plates,
wherein the plurality of diffusing plates are placed on a rotational member, and the driving mechanism rotates the rotational member, and
wherein a luminescent material layer is placed between the plurality of diffusing plates.

2. The light source unit according to claim 1, further comprising:
a light guiding optical system which causes the laser beam from the light source to be incident on the one diffusing plate of the plurality of diffusing plates and which causes the diffuse light emitted from the one diffusing plate to be incident on the other diffusing plate of the plurality of diffusing plate.

3. The light source unit according to claim 1, wherein the rotational member has a circular disk-like shape, the plurality of diffusing plates each have an arc-like shape, and the luminescent material layer and the plurality of diffusing plates are aligned along the circumferential edge of the rotational member,
wherein the plurality of diffusing plates transmit incident light, and
wherein diffuse light emitted from the one diffusing plate of the plurality of diffusing plates is caused to be incident on the other diffusing plate of the plurality of diffusing plates.

4. The light source unit according to claim 1, wherein collective lenses are provided which face the plurality of diffusing plates and which collect light which is incident on the plurality of diffusing plates.

5. The light source unit according to claim 1, wherein the plurality of diffusing plates are disposed so as to be spaced at equal intervals on the circumferential edge of the rotational member.

6. The light source unit according to claim 1, wherein the laser beam is light in a blue wavelength range, and the luminescent material layer emits luminous light in a green wavelength range.

7. A projector comprising:
the light source unit according to claim 1;
a display element which forms an optical image by light which is incident thereon;
a light source-side optical system which guides light from the light source unit to the display element;
a projection-side optical system which projects the optical image formed by the display element on to a screen; and
a projector control unit having a light source control device for the light source unit and a display element control device.

8. A light source unit comprising:
a light source which emits a laser beam;
a plurality of diffusing plates on which the laser beam is incident and which emit the laser beam incident thereon as diffuse light; and
a driving mechanism which moves the plurality of diffusing plates,
wherein the laser beam from the light source is incident on one diffusing plate of the plurality of diffusing plates, and diffuse light emitted from the one diffusing plate is incident on the other diffusing plate of the plurality of diffusing plates, and
wherein collective lenses are provided which face the plurality of diffusing plates and which collect diffuse light individually emitted from the plurality of diffusing plates.

9. A light source unit comprising:
a light source which emits a laser beam;

a plurality of diffusing plates on which the laser beam is incident and which emit the laser beam incident thereon as diffuse light; and a driving mechanism which moves the plurality of diffusing plates, wherein the laser beam from the light source is incident on one diffusing plate of the plurality of diffusing plates, and diffuse light emitted from the one diffusing plate is incident on the other diffusing plate of the plurality of diffusing plates, and wherein the diffuse light is caused to be incident on one of the plurality of diffusing plates a plurality of times.

10. A light source unit comprising:

a light source which emits a laser beam;

a diffusing plate on which the laser beam is incident and which emits the laser beam incident thereon as diffuse light; and a driving mechanism which moves the diffusing plate, wherein the laser beam from the light source is incident on a first area of the diffusing plate, and diffuse light emitted from the first diffusing area is incident on a second area of the diffusing plate which differs from the first area.

11. An image projection method comprising:

causing a laser beam from a light source to be incident on one diffusing plate of a plurality of moving diffusing plates to convert the laser beam into diffuse light;

causing the diffuse light emitted from the one diffusing plate to be incident on the other moving diffusing plate of the plurality of diffusing plates to further diffuse the diffuse light;

aligning an axis of light in a wavelength range which is different from a wavelength range of the laser beam from the light source with an axis of the laser beam which is converted into the diffuse light by the plurality of diffusing plates for incidence on a display element to thereby form projection image light.

* * * * *